July 19, 1949.　　　R. M. DILWORTH　　　2,476,405
LUBRICATING OIL CONDITIONER
Filed Nov. 27, 1942

Inventor
Richard M. Dilworth
By
Blackmore, Spencer & Flint
Attorneys

Patented July 19, 1949

2,476,405

UNITED STATES PATENT OFFICE 2,476,405

LUBRICATING OIL CONDITIONER

Richard M. Dilworth, Hinsdale, Ill., assignor to General Motors Corporation, Detroit, Mich., a corporation of Delaware Application November 27, 1942, Serial No. 467,107

1 Claim. (Cl. 257—216)

This invention has to do with apparatus for conditioning fluids, particularly with apparatus for filtering and cooling the lubricating oil of internal combustion engines.

The object of the invention is to provide apparatus which will efficiently filter and cool the lubricating oil of an internal combustion engine when the oil is hot and fluent and can pass freely through the filter and cooler but will not interrupt the flow of oil to the engine when the oil is too viscous to pass through the filter and/or the cooler or the filter and/or the cooler are clogged by congealed oil or other matter.

The principal feature of the invention is an oil cooler with a by-pass through which oil may flow to the engine when it is too viscous to pass through the cooler or the cooler is clogged by congealed oil or other matter but is so constructed and arranged that without employment of a valve oil is constrained to pass through the cooler and is, consequently, cooled when it is hot and fluent and can freely pass through the cooler.

For a better understanding of the nature and objects of this invention reference is made to the following specification and the accompanying drawing wherein is described and shown an embodiment of my invention.

Figure 1:
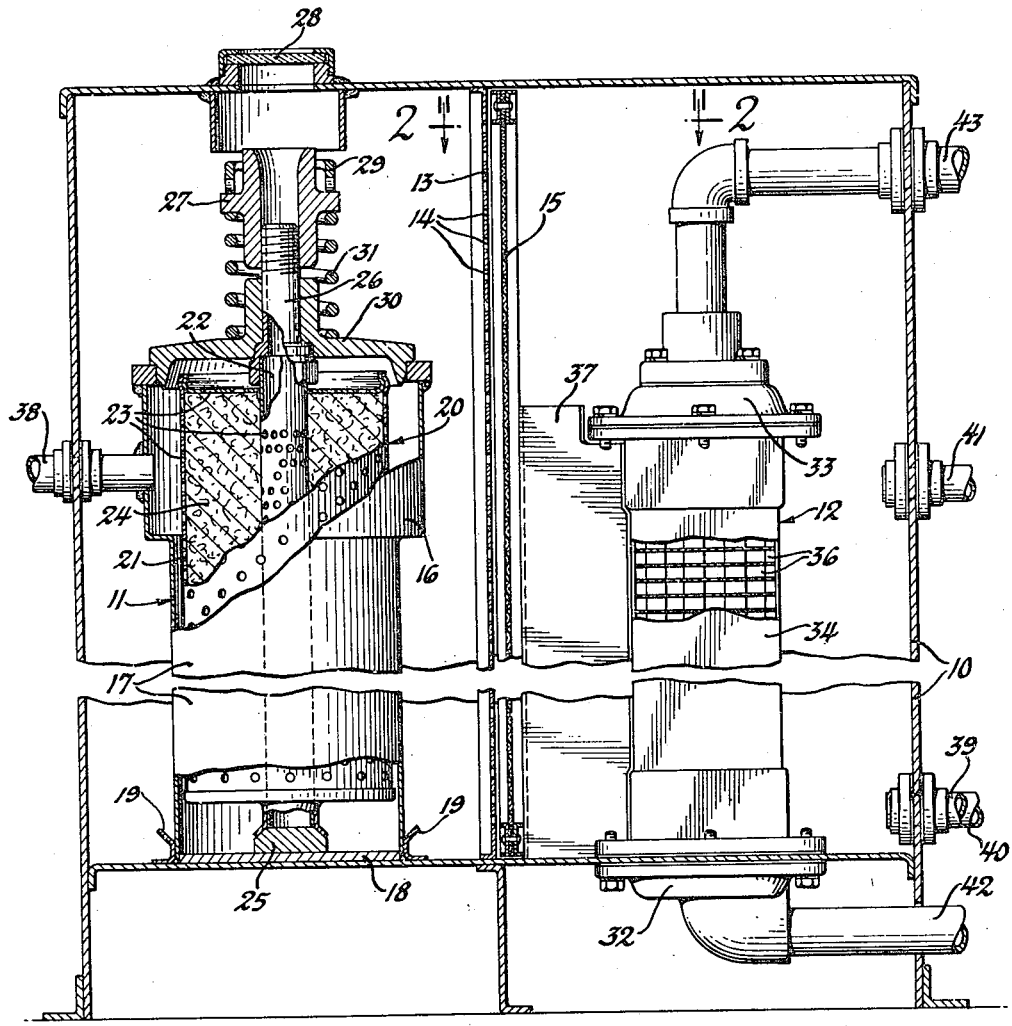
Figure 1 is a vertical section through a lubricating oil tank in which are installed an oil filter and an oil cooler in accordance with my invention.
Figure 2:
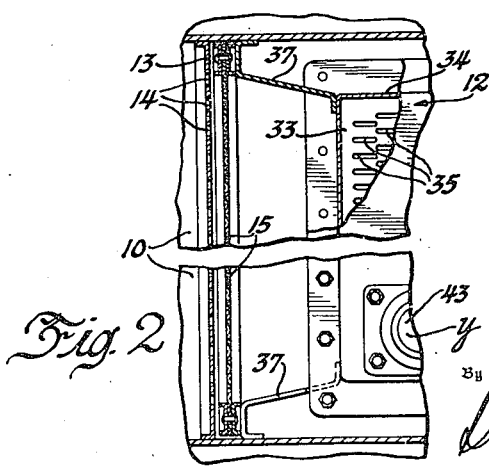
Figure 2 is a fragmentary section taken as indicated by the line 2—2 of Figure 1.

In the drawing the reference character 10 indicates a sheet metal lubricating oil tank in whose top there is an opening closed by a hinged door (not shown in the drawing) through which oil may be introduced into the tank. Within the tank, there is disposed, near one side, a filter 11 and, near the other side, a heat exchanger 12. From the top to the bottom and from one side to the other of the tank between the filter 11 and the heat exchanger 12 there extends a sheet metal wall 13 riddled with openings 14 and between the wall 13 and the heat exchanger a woven wire screen 15.

The filter 11 consists of one or more filter units and a header 16 which is common to the several units. Each of the filter units includes a vertically disposed imperforate cylindrical shell 17 whose lower end is closed by a head 18 and seated on the bottom of the tank 10 and whose upper end opens into the bottom of the header 16. To locate each of the several cylindrical shells 17 properly and to hold them in this position there are secured to the bottom of the tank brackets 19.

Within each of the shells 17 there is disposed a filter cartridge 20 which extends up into the header. Each of the cartridges consists of a shell 21 with heads on both of its ends and a tube 22 which extends through the shell and outwardly beyond the heads. The shell 21, its heads and the portion of the tube 22 between the heads are riddled with openings 23 and the space between the shell, its heads and the tube is filled with a suitable filter material 24.

The lower end of each of the tubes 22 is seated on and closed by a pedestal 25 fixed to the head 18 of the cylindrical shell 17 within which it is disposed. The upper end of each of the tubes extends into the lower end of a hollow bolt 26. Onto the upper end of each of the bolts 26 is screwed a nozzle 27 above which there is in the top of the tank an opening closed by a transparency 28. Suitable means, such as one or more members 29, are provided to hold the filter firmly in place in the tank.

In the top of the header 16 there is an opening coaxial with each of the cylindrical shells 17. On each of the hollow bolts 26 there is mounted so that it can slide from a position in which it closes to a position in which it leaves open and vice versa the corresponding opening in the top of the header 16 a valve 30. A spring 31 urges each of the valves to the position in which it closes the opening it controls.

The heat exchanger 12 which is suitably fixed to the bottom of the tank 10 is similar to an automobile engine cooling radiator. It includes lower and upper headers 32 and 33 and between the headers a core 34 with vertical passages 35 in it through which water may pass from one to the other of the headers and horizontal passages 36 in it through which oil may pass from one side to the other of the heat exchanger in heat exchanging relation to the water in the passages 35. Imperforate baffles 37 which extend from the side walls of the tank 10 to the heat exchanger 12 and from the bottom of the tank to about the level of the top of the upper header 33 of the heat exchanger prevent oil passing around the sides of the heat exchanger.

Through the wall of the tank there extends into the header 16 of the filter 11 an oil inlet pipe 38. Into the tank on the side of the heat exchanger 12 opposite the filter there open near the bottom of the tank oil outlet pipes 39 and 40 and somewhat below the level of the upper header of the heat exchanger an oil overflow pipe 41. To the upper and lower headers 33 and 32 of the heat exchanger there are connected water inlet and outlet pipes 43 and 42.

The lubricating oil tank illustrated in the drawing and hereinbefore described was designed for installation in the lubricating and cooling systems of a water cooled internal combustion engine equipped with pressure pumps for supplying lubricating oil to the bearings of the engine to lubricate them and to the pistons of the engine to cool them, a sump into which the oil drains from the bearings and pistons, a scavenging pump of greater capacity than both of the pressure pumps for withdrawing the oil from the sump, and a radiator for cooling and a pump for circulating engine cooling water. The tank is installed in the lubricating and cooling systems of such an engine with the discharge side of the oil scavenging pump connected to the pipe 38, the suction side of each of the oil pressure pumps connected to one of the pipes 39 and 40, the oil overflow pipe 41 connected to the sump into which oil drains from the bearings and the pistons of the engine, and the engine cooling water cooling radiator and pump connected to the pipes 42 and 43 so that engine cooling water passes through the passages 35 in the core of the heat exchanger 12.

Before the engine is started and each time its supply of oil is replenished a volume of oil considerably in excess of the capacity of the tank is preferably put into the lubricating system of the engine to obviate frequent replenishment of the oil supply without danger of running short of oil. When the tank is installed as described above and the engine is operating, the oil scavenging pump withdraws oil from the mentioned sump and forces it into the header 16 of the filter 11. Thence the oil passes, successively, into the part of the tank in which the filter is disposed and through the openings in the wall 13 and screen 15, into the portion of the tank between the screen and the heat exchanger. From this portion of the tank the oil passes into the portion of the tank on the other side of the heat exchanger. From the last mentioned portion of the tank the oil pressure pumps withdraw the quantity of oil required to lubricate the bearings and cool the pistons of the engine and advance it to these parts whence it drains back into the sump. The remainder of the oil which enters the tank passes directly to the sump through the overflow pipe 41 which thus serves to prevent the oil rising to an undesirably high level in the tank.

The oil follows the course generally described above as long as the engine is operating. However, its course through the tank varies with conditions.

If the oil is hot and fluent and the filter is not clogged by congealed oil or other matter, the valve or valves 30 will be opened only sufficiently to let a portion of the oil escape from the header 16 by the openings which the valves control and the other portion of the oil will pass through the filter material 24 and leave the filter by the nozzle or nozzles 27. However, if the oil is too viscous to pass through the filter material or the filter material is clogged by congealed oil or other matter, the valve or valves 30 will be opened sufficiently to let all of the oil escape from the header by the openings which the valves control. Thus, without danger of interruption of the supply of oil to the engine when the oil cannot pass through the filter, it is assured that a portion of the oil will be continuously filtered whenever the oil can pass through the filter.

Of course, when the tank 10 is installed as described above and the engine is operating, engine cooling water continuously passes through the passages 35 in the heat exchanger 12.

If the oil is hot and fluent and the passages 36 in the core of the heat exchanger are not clogged by congealed oil or other matter all of the oil which enters the tank will pass into the portion of the tank on the side of the heat exchanger most distant from the filter by way of the passages 36 and will, consequently, be cooled by the engine cooling water which passes through the passages 35 in the core of the heat exchanger. If the oil is too viscous to pass freely through the passages 36 or these passages are clogged by congealed oil or other matter the level of the oil in the portion of the tank on the side of the heat exchanger nearest the filter will rise and part or all of the oil which enters the tank will pass into the portion of it on the side of the heat exchanger most distant from the filter over the top of the heat exchanger and the baffles 37.

The passages 36 in the core of the heat exchanger should be of such number and size that when the oil is hot and fluent and the passages are not clogged by congealed oil or other matter all of the oil which enters the tank will pass from the portion of the tank on the side of the heat exchanger nearest the filter to the portion of the tank on the side of the heat exchanger most distant from the filter through them but sufficiently slowly to reduce to the desired value the temperature of the oil which enters the portion of the tank on the side of the heat exchanger most distant from the filter. Thus, without employment of a valve and without danger of interruption of the supply of oil to the engine when the oil cannot pass through the passages 36 in the core of the heat exchanger, it is assured that whenever the oil is hot and fluent and can pass through the passages 36 enough of it will be sufficiently cooled to reduce to the desired value the temperature of the oil advanced by the pressure pumps to the bearings and pistons of the engine.

I claim:

In apparatus for cooling a liquid whose viscosity increases as its temperature decreases, a tank, means, including a heat exchanger, which at distances from the ends of the tank extends from the bottom of the tank upwardly and across the tank from side wall to side wall and divides the tank into an inlet compartment and an outlet compartment, means through which liquid may be introduced into the inlet compartment, passages in the heat exchanger through which liquid may pass horizontally from the inlet compartment to the outlet compartment when it requires cooling but which when the liquid does not require cooling obstruct its passage so that its level in the inlet compartment tends to rise, and a passage above the specified means through which liquid may pass from the inlet compartment to the outlet compartment when it does not require cooling and its level in the inlet compartment has risen to above the specified means, the tank wall having an opening below the top of the specified means through which liquid may leave the outlet compartment.

RICHARD M. DILWORTH.

(References on following page)

REFERENCES CITED

The following references are of record in the file of this patent:

UNITED STATES PATENTS

| Number | Name | Date |
|---|---|---|
| 1,071,623 | Maranville | Aug. 26, 1913 |
| 1,101,969 | Still | June 30, 1914 |
| 1,350,521 | Roots | Aug. 24, 1920 |
| 1,384,873 | Strickland | July 19, 1921 |
| 1,539,607 | Spring | May 26, 1925 |
| 1,760,340 | Blackmore | May 27, 1930 |
| 1,776,726 | Gross | Sept. 23, 1930 |
| 1,860,731 | Cole | May 31, 1932 |
| 1,864,237 | Fauth | June 21, 1932 |
| 1,900,821 | Kline | Mar. 7, 1933 |
| 1,906,540 | Clarke | May 2, 1933 |
| 1,913,680 | McCray | June 13, 1933 |
| 1,920,800 | McCausland | Aug. 1, 1933 |
| 1,922,173 | Pedersen | Aug. 15, 1933 |
| 1,966,837 | Uhl | July 17, 1934 |
| 2,068,394 | Burckhalter et al. | Jan. 19, 1937 |
| 2,068,395 | Burckhalter et al. | Jan. 19, 1937 |
| 2,072,180 | Paton | Mar. 2, 1937 |
| 2,133,394 | Mortier | Oct. 18, 1938 |
| 2,303,261 | Dunmire | Nov. 24, 1942 |

FOREIGN PATENTS

| Number | Country | Date |
|---|---|---|
| 253,233 | Great Britain | June 17, 1926 |